United States Patent
Park et al.

(10) Patent No.: US 9,416,432 B2
(45) Date of Patent: Aug. 16, 2016

(54) LEACHING METHOD OF RARE-EARTH METALS USING HYDROCHLORIC ACID FROM MANGANESE NODULE

(71) Applicant: KOREA INSTITUTE OF GEOSCIENCE AND MINERAL RESOURCES, Daejeon (KR)

(72) Inventors: Jin-Tae Park, Daejeon (KR); Chul-Woo Nam, Daejeon (KR); Kyung-Ho Park, Daejeon (KR); Hyun-Ho Kim, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 14/608,757

(22) Filed: Jan. 29, 2015

(65) Prior Publication Data

US 2015/0211095 A1 Jul. 30, 2015

(30) Foreign Application Priority Data

Jan. 29, 2014 (KR) ........................ 10-2014-0011081

(51) Int. Cl.
*C22B 59/00* (2006.01)
*C22B 3/10* (2006.01)

(52) U.S. Cl.
CPC . *C22B 59/00* (2013.01); *C22B 3/10* (2013.01); *Y02P 10/234* (2015.11)

(58) Field of Classification Search
None
See application file for complete search history.

(56) References Cited

U.S. PATENT DOCUMENTS

2012/0156116 A1* 6/2012 Gao .......................... C22B 3/44
423/21.1

FOREIGN PATENT DOCUMENTS

| CN | 200710019940 A | * | 8/2007 |
| JP | 2009-249674 A | | 10/2009 |
| KR | 10-2005-0008061 A | | 1/2005 |
| KR | 10-2008-0057670 A | | 6/2008 |
| KR | 10-1036407 | | 5/2011 |
| KR | 10-1069964 | | 10/2011 |

OTHER PUBLICATIONS

Nam, et al., "Deep-sea manganese nodules processing technology," Ministry of Land, Transport and Maritime Affairs, Feb. 2013, 52 pages.
Nam, et al., "Deep-sea manganese nodules processing technology," Ministry of Land, Transport and Maritime Affairs, Feb. 2013, 44 pages.
KR Office Action with English translation of corresponding KR 10-2010-0011081, dated Mar. 24, 2014, 12 pages.
KR Notice of Allowance with English translation of corresponding KR 10-2010-0011081, dated Jul. 8, 2014, 5 pages.

* cited by examiner

*Primary Examiner* — Melissa Swain
(74) *Attorney, Agent, or Firm* — Lewis Roca Rothgerber Christie LLP

(57) ABSTRACT

The present invention relates to a leaching method of rare-earth metals using a hydrochloric acid from a manganese nodule, and more particularly, to a leaching method of rare-earth metals using a hydrochloric acid from a manganese nodule, in which a manganese nodule is mixed with a hydrochloric acid, then stirred and heated to leach the rare-earth metal included in the manganese nodule.

6 Claims, No Drawings

LEACHING METHOD OF RARE-EARTH METALS USING HYDROCHLORIC ACID FROM MANGANESE NODULE

CROSS-REFERENCE TO RELATED APPLICATION

This application claims priority to Korean Patent Application No. 10-2014-0011081 filed on Jan. 29, 2014, and all the benefits accruing therefrom under 35 U.S.C. §119, the contents of which is incorporated by reference in its entirety.

BACKGROUND OF THE INVENTION

1. Field of the Invention

The present invention relates to a leaching method of rare-earth metals using a hydrochloric acid from a manganese nodule.

2. Description of the Related Art

A deep-sea floor manganese nodule is a marine mineral resource, which is endowed at a deep-sea floor of the Pacific Ocean, the Indian Ocean, etc., and contains a great amount of copper, nickel, cobalt and manganese. When developing the deep-sea floor manganese nodule, a smelting technology, which is a process for extracting, separating and collecting valuable metals form the manganese nodule, is an important part which accounts for at least 50% of overall investments in facilities and at least 60% of overall investments in operating costs. A method of smelting the manganese nodule can be classified into a reduction smelting-wet leaching method, a roasting-leaching method and a direct leaching method, and among these methods, the reduction smelting-leaching method, which uses both of dry and wet smelting methods, can easily process and recycle smelting residues and does not use excess amounts of chemicals, is evaluated as an emerging process.

A process of the reduction smelting-leaching method of the manganese nodule includes two steps. First, in step one, the reduction smelting method is used to separate the manganese nodule into a slag, which includes manganese, aluminum, silica, an alkali metal and a portion of iron of the manganese nodule, and a metal alloy, which includes nickel, copper, cobalt and iron of the manganese nodule. The alloy has a poor solubility and is not easily crushed, so sulfur is added to produce a matte. In step two, the matte is dissolved by using an inorganic acid and a solvent extraction method is used to separate the dissolved matte into each metal, then an electrowinning method is used to obtain a final product of a metal or a metallic compound. For typical technologies for leaching the valuable metal from the matte, there are a high temperature high pressure sulfuric acid leaching method and a chlorine gas leaching method. The high temperature high pressure sulfuric acid leaching method uses an autoclave and a sulfuric acid as a leaching reagent, and the matte is reacted in a temperature of 120 to 180° C. and 5 to 10 atmospheric pressure for 1 to 4 hours. However, this method requires a high priced leaching apparatus having corrosion resistant, high temperature resistant and high pressure resistant properties, and requires excessive energy to maintain the leaching solution at a high temperature.

As related arts, there is Korean Registered Patent No. 10-1069964 (Published on Oct. 4, 2011), which discloses a method of manufacturing a valuable metal compound from a manganese nodule.

SUMMARY OF THE INVENTION

The present invention provides a leaching method of rare-earth metals using a hydrochloric acid from a manganese nodule, which can match with the requirements of the green environment and the industry by reducing an environmental pollution and is economically appropriate because a rare-earth metal leaching rate can be maximized.

Objects of the present invention may not be limited to the described object, and other objects will be clearly understandable to those of ordinary skill in the art from the disclosures provided below.

To solve the object, the present invention provides a leaching method of rare-earth metals using a hydrochloric acid from a manganese nodule, in which a manganese nodule is mixed with a hydrochloric acid, then stirred and heated to leach the rare-earth metals included in the manganese nodule.

In addition, 10 g to 20 g of the manganese nodule may be mixed with one liter of the hydrochloric solution.

A concentration of the hydrochloric solution may be 0.4 M to 0.6 M.

The leaching may be performed at 100 rpm to 500 rpm.

The heating may be performed at 30° C. to 45° C.

The leaching may be performed for 50 to 70 minutes.

The manganese nodule may include Y, La, Ce, Pr, Nd, Sm, Eu, Gd, Tb, Dy, Ho, Er, Tm, Yb, Lu, Th, U, Fe, Cu, Mn, Co and Ni.

The leaching method of rare-earth metals using a hydrochloric acid from a manganese nodule may further include sonicating at 35 W to 45 W when leaching.

In addition, the present invention provides a leaching method of rare-earth metals using a hydrochloric acid from a manganese nodule, the method including: mixing a manganese nodule with a hydrochloric solution; leaching rare-earth metals included in the manganese nodule by stirring and heating the mixture; and adding an extraction agent in the solution, in which the rare-earth metal is leached, to separate non-rare-earth metals from the rare-earth metals and concentrating the rare-earth metals.

In this case, the extraction agent may be a di-2-ethylhexyl phosphoric acid.

According to the present invention, a process cost can be reduced since a process for producing a manganese nodule into a matte is not required, and only rare-earth metals included in the manganese nodule can be selectively leached by controlling a concentration of a hydrochloric solution.

In addition, the rare-earth metals can be leached at a low temperature when leaching the manganese nodule and the leaching is performed at an atmospheric pressure thus the process cost can be significantly reduced, and an environmental pollution can be minimized by using a low concentration hydrochloric acid.

DETAILED DESCRIPTION OF THE INVENTION

Hereinafter, embodiments according to the present invention are described in detail with reference to the accompanying drawings.

Advantages and features of the present invention, and method for achieving thereof will be apparent with reference to the examples that follow.

However, it should be understood that the present invention is not limited to the following embodiments and may be embodied in different ways, and that the embodiments are given to provide complete disclosure of the invention and to provide thorough understanding of the invention to those skilled in the art, and the scope of the invention is limited only by the accompanying claims and equivalents thereof.

In addition, when describing embodiments of the present invention, detailed descriptions of well-known functions and structures incorporated herein may be omitted when they make the subject matter of the present invention unclear.

The present invention provides a leaching method of rare-earth metals using a hydrochloric acid from a manganese nodule, in which a manganese nodule is mixed with a hydrochloric acid, then stirred and heated to leach the rare-earth metal included in the manganese nodule.

In the leaching method of rare-earth metals using a hydrochloric acid from a manganese nodule according to the present invention, a process cost can be reduced since a process for producing a manganese nodule into a matte is not required, and only rare-earth metals included in the manganese nodule are selectively leached by controlling a concentration of a hydrochloric solution. In addition, the rare-earth metals can be leached at a low temperature when leaching the manganese nodule and the leaching is performed at an atmospheric pressure thus the process cost can be significantly reduced. When the manganese nodule is leached by a citric acid, an oxalic acid, a sulfuric acid and an ammonium sulfate, sodium and an acetic acid, etc., the rare-earth metals and also base metals, which are non-rare-earth metals, are leached at a high leaching rate or the leaching rate of the rare-earth metals is very low, but the leaching method according to the present invention has the leaching rate of the rare-earth metals of at least 45% and the leaching rate of the non-rare-earth metals is about 2% so the method is the most appropriate method for leaching only the rare-earth metals.

In the leaching method of rare-earth metals using a hydrochloric acid from a manganese nodule according to the present invention, the manganese nodule includes Y, La, Ce, Pr, Nd, Sm, Eu, Gd, Tb, Dy, Ho, Er, Tm, Yb, Lu, Th, U, Fe, Cu, Mn, Co and Ni. (Refer to the Table 1 below)

In addition, 10 to 20 g (pulp density of 10% to 20%) of the manganese nodule is preferably mixed with one liter of the hydrochloric solution. When less than 10 g of the manganese nodule is mixed with one liter of the hydrochloric solution, an amount of the leached rare-earth metals is small compared to an amount of hydrochloric solution used, when exceeding 20 g, an amount of the manganese nodule reacting with the hydrochloric acid becomes too great so the leaching reaction is not smoothly performed.

In addition, a concentration of the hydrochloric solution is preferably 0.4 M to 0.6 M. When the concentration of the hydrochloric solution is less than 0.4 M, the amount of the rare-earth metals leached from the manganese nodule is too less, and when exceeding 0.6 M, the amount of the leached rare-earth metals becomes too much.

A stirring after mixing the manganese nodule and the hydrochloric solution is preferably performed at 100 rpm to 500 rpm. When the stirring is performed at less than 100 rpm, the reaction between the manganese nodule and the hydrochloric solution decrease, and when exceeding 500 rpm, the amount of the leached rare-earth metals do not increase compared to a high stirring speed, so in an aspect of process efficiencies, the stirring is preferably performed at 500 rpm or less.

In addition, a heating process after the stirring process is preferably performed at 30° C. to 45° C. When heated at a temperature of less than 30° C., the leaching rate of the rare-earth metals is reduced, and when exceeding 45° C., the leaching rate of the non-rare-earth metals is increased.

The leaching is preferably performed for 50 to 70 minutes. When the leaching is performed for less than 50 minutes, the rare-earth metals are not sufficiently leached, and when exceeding 70 minutes, the leaching rate of the non-rare-earth metals is increased.

In addition, the leaching method of rare-earth metals using a hydrochloric acid from a manganese nodule may further include sonicating at 35 W to 45 W when leaching. When sonicating when leaching, the reaction of the hydrochloric solution and the manganese nodule is improved so that the leaching rate of the rare-earth metals is improved, but as illustrated in Table 2, an effect of the sonication is insignificant so sonicating may be omitted.

In addition, the present invention provides a leaching method of rare-earth metals using a hydrochloric acid from a manganese nodule, the method including: mixing a manganese nodule with a hydrochloric solution, and leaching a rare-earth metal included in the manganese nodule by stirring and heating; and adding an extraction agent in the solution, in which the rare-earth metals are leached, separating non-rare-earth metals from the rare-earth metal and concentrating the rare-earth metals.

Both of the rare-earth metals and the non-rare-earth metals are all leached in a leaching solution after the leaching process, and the extraction agent may be used to separate the rare-earth metals from a small amount of the non-rare-earth metals such as copper, nickel, etc., so that the rare-earth metals are separated and concentrated. For the extraction agent, a di-2-ethylhexyl phosphoric acid (D2EHPA) may be used.

Embodiment 1: Leaching the Rare-Earth Metal 1

10 g of the manganese nodule was mixed with 1 L of the hydrochloric solution of 0.5 M and then stirred at 500 rpm and heated at 45° C. to leach the rare-earth metals included in the manganese nodule.

The following Table 1 illustrates the element and amount included in the manganese nodule.

TABLE 1

| Component | [M], mg/Kg | Component | [M], mg/Kg |
| --- | --- | --- | --- |
| Y | 94.03 | Er | 16.7 |
| La | 100 | Tm | 2.68 |
| Ce | 298 | Yb | 16.1 |
| Pr | 37.7 | Lu | 2.7 |
| Nd | 148 | Th | 27.6 |
| Sm | 37.9 | U | 4.91 |
| Eu | 10.3 | Fe | 37300 |
| Gd | 37.5 | Cu | 8800 |
| Tb | 6.63 | Mn | 239200 |
| Dy | 32.6 | Co | 1530 |
| Ho | 6.71 | Ni | 10200 |

Embodiment 2: Leaching the Rare-Earth Metal 2

Except for using the hydrochloric acid of 0.4 M and a leaching time of 2 hours, the rare-earth metals were leached by the same method of the embodiment 1.

Embodiment 3: Leaching the Rare-Earth Metal 3

Except for sonicating at 40 W when leaching, the rare-earth metals were leached by the same method of the embodiment 2.

Embodiment 4: Leaching the Rare-Earth Metal 4

10 g of the manganese nodule was mixed with 1 L of the hydrochloric solution of 0.5 M and then stirred at 500 rpm and heated at 45° C. to leach the rare-earth metals included in the manganese nodule, and then a D2EHPA was added to the rare-earth metal leached solution (rare-earth metal concentration of about 500 ppm) for a solvent extraction and the rare-earth metals were separated from the non-rare-earth metals and concentrated. In this case, the concentration of the concentrated rare-earth metals was 5.6 g/L.

Comparative Example 1

Leaching the Rare-Earth Metals by Using the Hydrochloric Solution of 0.2 M 10 g of the manganese nodule was mixed with 1 L of the hydrochloric solution of 0.2 M and then stirred at 500 rpm and heated at 45° C. to leach the rare-earth metals included in the manganese nodule for 2 hours.

Comparative Example 2

Leaching the Rare-Earth Metals by Using the Citric Acid of 1 M 10 g of the manganese nodule was mixed with 1 L of the citric acid solution of 1 M and then stirred at 500 rpm and heated at 30° C. to leach the rare-earth metals included in the manganese nodule for 2 hours.

Comparative Example 3

Leaching the Rare-Earth Metals by Using the Oxalic Acid 10 g of the manganese nodule was mixed with 1 L of the oxalic acid solution of 1 M and then stirred at 500 rpm and heated at 30° C. to leach the rare-earth metals included in the manganese nodule for 2 hours.

Comparative Example 4

Leaching the Rare-Earth Metals by Using the Sulfuric Acid and the Sodium Sulfate 10 g of the manganese nodule was mixed with 500 mL of the sulfuric acid solution of 0.1 M and 500 mL of the sodium sulfate solution of 1 M and then stirred at 500 rpm and sonicated to leach the rare-earth metals included in the manganese nodule for 2 hours.

Comparative Example 5

Leaching the Rare-Earth Metals by Using the Sulfuric Acid and the Ammonium Sulfate 10 g of the manganese nodule was mixed with 500 mL of the sulfuric acid solution of 0.5 M and the ammonium sulfate solution of 1 M and then stirred at 500 rpm and sonicated to leach the rare-earth metals included in the manganese nodule for 2 hours.

Comparative Example 6

Leaching the Rare-Earth Metals by Using Sodium Acetate and the Acetic Acid 10 g of the manganese nodule was mixed with 500 mL of the sodium acetated solution of 0.1 M and the acetic acid solution of 0.1 M and then stirred at 500 rpm and heated at 30° C. to leach the rare-earth metals included in the manganese nodule for 2 hours.

The following Table 2 illustrates types and concentrations of the extraction agent, temperatures during leaching, times, pulp densities and stirring speeds.

TABLE 2

| Example | Leaching agent | Temperature (° C.) | Time (hour) | Pulp density (%) | Stirring speed (rpm) |
| --- | --- | --- | --- | --- | --- |
| Embodiment 1 | 0.4M HCl | 45 | 1 | 10 | 500 |
| Comparative example 1 | 0.2M HCl | 45 | 2 | 10 | 500 |
| Embodiment 2 | 0.4M HCl | 45 | 2 | 10 | 500 |
| Comparative example 2 | 1M Citric acid | 30 | 2 | 10 | 500 |
| Comparative example 3 | 1M Oxalic acid | 30 | 2 | 10 | 500 |
| Comparative example 4 | 0.1M Sulfuric acid + 1M Sodium sulfate | Sonication | 2 | 10 | 500 |
| Comparative example 5 | 0.1M Sulfuric acid + 0.1M Sodium sulfate | Sonication | 2 | 10 | 500 |
| Comparative example 6 | 0.1M Sodium acetate + 0.1M Acetic acid | 30 | 2 | 10 | 500 |
| Embodiment 3 | 0.4M Hydrochloric acid + Sonication (40 W) | 45 | 2 | 10 | 500 |

Experimental Example 1

Analysis of the Leaching Rate of the Rare-Earth Metals According to the Leaching Agent In the leaching method of rare-earth metals according to the present invention, the leaching rate of the rare-earth metals was analyzed when the hydrochloric solution was used as the leaching agent and when the leaching agent other than the hydrochloric solution was used and is illustrated in Table 3.

while, when sonicated when leaching the rare-earth metals, the leaching rates of the rare-earth metals and the base metals were slightly improved compared to the embodiment 2.

Experimental Example 2

Analysis of the Leaching Rate of the Rare-Earth Metals According to the Leaching Time In the leaching method of rare-earth metals using a hydrochloric acid from a manganese nodule according to the present invention, the leaching rate of the rare-earth metals according to the leaching time is analyzed and the results are illustrated in Table 4.

Components of the rare-earth metals with respect to the leaching experiment result were analyzed by an ICP-MS, and other base metals were measured by an ICP-OES.

TABLE 3

| | | | | | Experiment | | | | |
|---|---|---|---|---|---|---|---|---|---|
| | | comparative example 1 | embodiment 2 | comparative example 2 | comparative example 3 | comparative example 4 | comparative example 5 | comparative example 6 | embodiment 3 |
| pH | | 0.86 → 1.13 | 0.62 → 0.69 | 2.80 → 3.63 | 3.71 → 4.21 | 2.92 → 3.30 | 3.21 → 3.53 | 3.59 → 4.60 | 0.62 → 0.70 |
| | | | | Extraction rate (%) | | | | | |
| Y | | 1.68 | 79.97 | 58.28 | 1.38 | 48.18 | 59.45 | 0.96 | 84.97 |
| La | | 1.19 | 70.20 | 62.00 | 0.70 | 31.80 | 38.40 | 0.20 | 74.30 |
| Ce | | 0.83 | 13.79 | 67.45 | 0.67 | 2.42 | 2.32 | 0.03 | 14.73 |
| Pr | | 0.56 | 58.62 | 58.89 | 0.53 | 26.26 | 32.63 | 0.53 | 62.86 |
| Nd | | 0.53 | 61.62 | 44.12 | 0.47 | 22.64 | 28.11 | 0.68 | 66.35 |
| Sm | | 0.50 | 58.58 | 50.92 | 0.53 | 22.69 | 27.44 | 1.06 | 63.59 |
| Eu | | 0.68 | 54.37 | 53.40 | 0.97 | 24.27 | 30.10 | 20.39 | 58.25 |
| Gd | | 0.59 | 60.00 | 55.20 | 0.53 | 24.80 | 30.13 | 1.07 | 65.33 |
| TB | | 0.60 | 54.30 | 57.32 | 1.51 | 27.15 | 33.18 | 1.51 | 60.33 |
| Dy | | 0.46 | 58.59 | 51.84 | 0.61 | 24.54 | 29.14 | 0.61 | 64.42 |
| Ho | | 0.60 | 55.14 | 55.14 | 1.49 | 25.34 | 29.81 | 1.49 | 61.10 |
| Er | | 0.66 | 58.08 | 50.30 | 0.60 | 23.35 | 26.95 | 1.20 | 64.07 |
| Tm | | 0.37 | 59.70 | 52.24 | 3.73 | 22.39 | 26.12 | 3.73 | 67.16 |
| Yb | | 0.56 | 54.66 | 49.07 | 0.62 | 19.25 | 21.74 | 1.24 | 60.87 |
| Lu | | 0.74 | 59.26 | 51.85 | 3.70 | 22.22 | 22.22 | 3.70 | 62.96 |
| Th | | 0.00 | 0.36 | 52.17 | 1.45 | 0.36 | 0.36 | 0.36 | 0.36 |
| U | | 3.26 | 52.95 | 50.92 | 44.81 | 28.51 | 20.37 | 107.94 | 59.06 |
| Fe | | 0.05 | 1.39 | 124.40 | 67.29 | 2.64 | 0.21 | 0.00 | 1.18 |
| Cu | | 0.23 | 42.27 | 110.11 | 1.15 | 11.82 | 6.49 | 0.00 | 39.66 |
| Mn | | 0.02 | 0.56 | 90.30 | 7.90 | 0.20 | 0.13 | 0.00 | 0.53 |
| Co | | 1.31 | 1.31 | 133.99 | 1.31 | 1.31 | 1.31 | 0.01 | 1.31 |
| Ni | | 1.59 | 23.24 | 112.75 | 0.20 | 7.74 | 8.29 | 0.04 | 25.20 |
| Total | rare earth metal | 0.83 | 45.55 | 58.09 | 1.00 | 19.24 | 23.18 | 1.33 | 48.94 |
| | common metal | 0.09 | 2.68 | 96.17 | 14.86 | 1.12 | 0.62 | 0.002 | 2.62 |

As illustrated in Table 3, in the case of the embodiment 2, the leaching rate of the rare-earth metals was 45.55%, and the leaching rate of the base metals was 2.68%, but in the case of the embodiment 1, the leaching rates of the rare-earth metals and the base metals were too low. In addition, in the case of the comparative example 2, the leaching rates of the rare-earth metals and the base metals were too high, and in the cases of the comparative embodiments 3, 4, 5, and 6, the leaching rates of the rare-earth metals were too low. Meanwhile

TABLE 4

| | M. N (compo.) | | ICP/Mass value (ppm) | | | | Amount (mg) | | | | Extraction rate (%) | | | |
|---|---|---|---|---|---|---|---|---|---|---|---|---|---|---|
| | mg/ | mg/ | Time (min) | | | | Time (min) | | | | Time (min) | | | |
| element | Kg | 30 g | 30 | 60 | 90 | 120 | 30 | 60 | 90 | 120 | 30 | 60 | 90 | 120 |
| Y | 94.03 | 2.8209 | 6.30 | 6.87 | 7.52 | 7.35 | 1.89 | 2.06 | 2.26 | 2.21 | 67.00 | 73.06 | 79.97 | 78.17 |
| La | 100 | 3 | 5.96 | 6.43 | 7.02 | 6.73 | 1.79 | 1.93 | 2.11 | 2.02 | 59.60 | 64.30 | 70.20 | 67.30 |
| Ce | 298 | 8.94 | 3.42 | 3.77 | 4.11 | 3.95 | 1.03 | 1.13 | 1.23 | 1.19 | 11.48 | 12.65 | 13.79 | 13.26 |
| Pr | 37.7 | 1.131 | 1.85 | 2.02 | 2.21 | 2.13 | 0.56 | 0.61 | 0.66 | 0.64 | 49.07 | 53.58 | 58.62 | 56.50 |
| Nd | 148 | 4.44 | 7.63 | 8.32 | 9.12 | 8.82 | 2.29 | 2.50 | 2.74 | 2.65 | 51.55 | 56.22 | 61.62 | 59.59 |
| Sm | 37.9 | 1.137 | 1.87 | 2.05 | 2.22 | 2.17 | 0.56 | 0.62 | 0.67 | 0.65 | 49.34 | 54.09 | 58.58 | 57.26 |
| Eu | 10.3 | 0.309 | 0.46 | 0.51 | 0.56 | 0.54 | 0.14 | 0.15 | 0.17 | 0.16 | 44.66 | 49.51 | 54.37 | 52.43 |
| Gd | 37.5 | 1.125 | 1.88 | 2.06 | 2.25 | 2.19 | 0.56 | 0.62 | 0.68 | 0.66 | 50.13 | 54.93 | 60.00 | 58.40 |
| TB | 6.63 | 0.1989 | 0.30 | 0.33 | 0.36 | 0.36 | 0.09 | 0.10 | 0.11 | 0.11 | 45.25 | 49.77 | 54.30 | 54.30 |
| Dy | 32.6 | 0.978 | 1.60 | 1.75 | 1.91 | 1.87 | 0.48 | 0.53 | 0.57 | 0.56 | 49.08 | 53.68 | 58.59 | 57.36 |
| Ho | 6.71 | 0.2013 | 0.31 | 0.34 | 0.37 | 0.36 | 0.09 | 0.10 | 0.11 | 0.11 | 46.20 | 50.67 | 55.14 | 53.65 |

TABLE 4-continued

| element | M. N (compo.) mg/Kg | M. N (compo.) mg/30 g | ICP/Mass value (ppm) Time (min) 30 | 60 | 90 | 120 | Amount (mg) Time (min) 30 | 60 | 90 | 120 | Extraction rate (%) Time (min) 30 | 60 | 90 | 120 |
|---|---|---|---|---|---|---|---|---|---|---|---|---|---|---|
| Er | 16.7 | 0.501 | 0.81 | 0.89 | 0.97 | 0.96 | 0.24 | 0.27 | 0.29 | 0.29 | 48.50 | 53.29 | 58.08 | 57.49 |
| Tm | 2.68 | 0.0804 | 0.13 | 0.15 | 0.16 | 0.16 | 0.04 | 0.05 | 0.05 | 0.05 | 48.51 | 55.97 | 59.70 | 59.70 |
| Yb | 16.1 | 0.483 | 0.74 | 0.81 | 0.88 | 0.87 | 0.22 | 0.24 | 0.26 | 0.26 | 45.96 | 50.31 | 54.66 | 54.04 |
| Lu | 2.7 | 0.081 | 0.13 | 0.15 | 0.16 | 0.16 | 0.04 | 0.05 | 0.05 | 0.05 | 48.15 | 55.56 | 59.26 | 59.26 |
| Th | 27.6 | 0.828 | 0.01 | 0.01 | 0.01 | 0.01 | 0.00 | 0.00 | 0.00 | 0.00 | 0.36 | 0.36 | 0.36 | 0.36 |
| U | 4.91 | 0.1473 | 0.26 | 0.26 | 0.26 | 0.24 | 0.08 | 0.08 | 0.08 | 0.07 | 52.95 | 52.95 | 52.95 | 48.88 |
| Fe | 37300 | 1119 | 70.00 | 58.00 | 52.00 | 44.00 | 21.00 | 17.40 | 15.60 | 13.20 | 1.88 | 1.55 | 1.39 | 1.18 |
| Cu | 8800 | 264 | 371 | 365 | 372 | 354 | 111.3 | 109.5 | 111.6 | 106.2 | 42.16 | 41.48 | 42.27 | 40.23 |
| Mn | 239200 | 7176 | 131 | 130 | 134 | 128 | 39.3 | 39 | 40.2 | 38.4 | 0.55 | 0.54 | 0.56 | 0.54 |
| Co | 1530 | 45.9 | 2 | 2 | 2 | 6 | 0.6 | 0.6 | 0.6 | 1.8 | 1.31 | 1.31 | 1.31 | 3.92 |
| Ni | 10200 | 306 | 119 | 178 | 237 | 280 | 35.7 | 53.4 | 71.1 | 84 | 11.67 | 17.45 | 23.24 | 27.45 |
| Total rare earth metal (REE) | | 26.4018 | 33.66 | 36.72 | 40.09 | 38.87 | 10.098 | 11.016 | 12.027 | 11.661 | 38.25 | 41.72 | 45.55 | 44.17 |
| common metal | | 8910.9 | 693 | 733 | 797 | 812 | 207.9 | 219.9 | 239.1 | 243.6 | 2.33 | 2.47 | 2.68 | 2.73 |
| REE (Ce except) | | 17.4618 | 30.24 | 32.95 | 35.98 | 34.92 | 9.072 | 9.885 | 10.794 | 10.476 | 51.95 | 56.61 | 61.81 | 59.99 |

As illustrated in Table 4, as the leaching time was increased, not only did the leaching rate of the rare-earth metals increase but also the leaching rate of the base metals. Therefore, when taking the leaching rate of the base metals into consideration, the leaching of the rare-earth metals is economical at about one hour.

Experimental Example 3

Analysis of the Leaching Rate of the Rare-Earth Metals According to the Leaching Speed In the leaching method of rare-earth metals using a hydrochloric acid from a manganese nodule according to the present invention, the leaching rate of the rare-earth metals according to the leaching speed is analyzed and the results are illustrated in Table 5.

TABLE 5

| Stirring speed (rpm) | Leaching rate (%) Rare-earth metal | Rare-earth metal (Excluding Ce) | Fe | Cu | Mn | Co | Ni |
|---|---|---|---|---|---|---|---|
| 100 | 40.07 | 50.7 | 7.83 | 56.02 | 0.92 | 1.31 | 8.53 |
| 300 | 40.18 | 51.54 | 7.48 | 52.16 | 0.83 | 1.31 | 8.00 |
| 500 | 41.75 | 53.41 | 7.72 | 54.43 | 0.88 | 1.31 | 8.16 |

As illustrated in Table 5, the stirring speed did not have a huge influence in the leaching rate of the rare-earth metals so the speed of 100 rpm to 500 rpm is appropriate, but the speed of 500 rpm is determined as the most appropriate for a smooth mixing and an efficiency of the manganese nodule and the hydrochloric solution.

Experimental Example 4

Analysis of the Leaching Rate of the Rare-Earth Metals According to the Concentration of the Hydrochloric Solution In the leaching method of rare-earth metals using a hydrochloric acid from a manganese nodule according to the present invention, the leaching rate of the rare-earth metals according to the concentration of the hydrochloric solution is analyzed and the results are illustrated in Table 6.

TABLE 6

| Concentration of hydrochloric solution (M) | Leaching rate (%) Rare-earth metal | Rare-earth metal (Excluding Ce) | Fe | Cu | Mn | Co | Ni |
|---|---|---|---|---|---|---|---|
| 0.5 | 41.75 | 53.41 | 7.72 | 54.43 | 0.88 | 1.31 | 8.16 |
| 1.0 | 61.17 | 70.49 | 24.08 | 66.02 | 1.16 | 1.31 | 11.47 |
| 1.5 | 68.77 | 75.63 | 34.58 | 67.73 | 1.48 | 1.96 | 14.02 |
| 2.0 | 76.96 | 80.63 | 46.92 | 70.11 | 2.64 | 5.88 | 18.53 |
| 3.0 | 94.15 | 91.16 | 74.26 | 91.02 | 13.71 | 29.54 | 35.00 |
| 4.0 | 99.75 | 93.96 | 96.51 | 95.23 | 40.38 | 73.20 | 61.86 |
| 5.0 | 100.00 | 95.14 | 99.95 | 100.00 | 86.54 | 94.77 | 100.00 |

As illustrated in Table 6, as the concentration of the hydrochloric solution increases, the leaching rate of the rare-earth metals increased, but the leaching rate of the base metals such as Fe, Cu, Mn, Co and Ni also increased, so the hydrochloric solution of 0.5 M is determined as the most appropriate when simultaneously taking the leaching rates of the rare-earth metals and the base metals into consideration.

Experimental Example 5

Analysis of the Leaching Rate of the Rare-Earth Metals According to the Temperature In the leaching method of rare-earth metals using a hydrochloric acid from a manganese nodule according to the present invention, the leaching rate of the rare-earth metals according to the temperature is analyzed and the results are illustrated in Table 7.

TABLE 7

| Temperature (° C.) | Leaching rate (%) Rare-earth metal | Rare-earth metal (Excluding Ce) | Fe | Cu | Mn | Co | Ni |
|---|---|---|---|---|---|---|---|
| 30 | 41.75 | 53.41 | 7.72 | 54.43 | 0.88 | 1.31 | 8.16 |
| 45 | 52.18 | 65.41 | 7.48 | 52.16 | 0.83 | 1.31 | 8.00 |
| 60 | 56.83 | 69.51 | 5.68 | 52.16 | 1.10 | 1.31 | 49.12 |
| 75 | 58.89 | 70.49 | 6.30 | 60.68 | 1.61 | 1.31 | 63.82 |
| 90 | 56.73 | 67.91 | 4.16 | 60.34 | 1.95 | 1.31 | 65.98 |

As illustrated in Table 7, the leaching rate of the rare-earth metals did not largely increase even when the temperature was increased, but relatively, the leaching rate of the base metals excluding the rare-earth metals largely increased, so the temperature of 30° C. to 45° C. is appropriate when simultaneously taking the leaching rates of the rare-earth metals and the base metals into consideration, and the temperature of 45° C., in which the leaching rate of the rare-earth metals is high and the leaching rate of the base metals is low, is the most appropriate.

While the leaching method of rare-earth metals using a hydrochloric acid from a manganese nodule according to embodiments of the present invention has been described, it will be understood by those of ordinary skill in the art that various substitutions, changes in form and alterations may be made therein without departing from the spirit and the scope of the present invention.

Therefore, the scope of the present invention is not limited to the described embodiments, but is limited only by the accompanying claims and equivalents thereof, and any alterations equivalent to the accompanying claims are within the scope of the present invention.

That is, the described embodiments are completely for a description, and it should not be interpreted in any way to limit the scope of the present invention. The scope of the present invention is only defined by within the scope of the accompanying claims, and all various substitutions, changes in form and alterations derived from the meaning, scope and equivalents are within the scope of the present invention.

What is claimed is:

1. A leaching method of rare-earth metals from a manganese nodule, using a hydrochloric acid, the method comprising:

mixing a manganese nodule including element selected from the group consisting of Y, La, Ce, Pr, Nd, Sm, Eu, Gd, Tb, Dy, Ho, Er, Tm, Yb, Lu, Th, U, Fe, Cu, Mn, Co and Ni with 0.4 M to 0.6 M of hydrochloric acid to form a mixture; and leaching the rare-earth metals (Y, La, Ce, Pr, Nd, Sm, Eu, Gd, Tb, Dy, Ho, Er, Tm, Yb, Lu, Th and U) included in the manganese nodule at a leaching rate of 45% to 49% and base metals (Fe, Cu, Mn, Co and Ni) at a leaching rate of 2.62% to 2.68% by stirring and heating the mixture at a temperature of 30° C. to 45° C., wherein 10 g to 20 g of the manganese nodule is mixed with one liter of the hydrochloric acid.

2. The leaching method according to claim 1, wherein the stirring is performed at 100 rpm to 500 rpm.

3. The leaching method according to claim 1, wherein the leaching is performed for 50 to 70 minutes.

4. The leaching method according to claim 1, further comprising sonicating at 35 W to 45 W after leaching.

5. A leaching method of rare-earth metals from a manganese nodule, using a hydrochloric acid, the method comprising:

mixing a manganese nodule including elements selected from the group consisting of Y, La, Ce, Pr, Nd, Sm, Eu, Gd, Tb, Dy, Ho, Er, Tm, Yb, Lu, Th, U, Fe, Cu, Mn, Co and Ni with 0.4 M to 0.6 M of hydrochloric acid to form a mixture; and leaching the rare-earth metals (Y, La, Ce, Pr, Nd, Sm, Eu, Gd, Tb, Dy, Ho, Er, Tm, Yb, Lu, Th and U) included in the manganese nodule to a leaching rate of 45% to 49% by stirring and heating the mixture at a temperature of 30° C. to 45° C.; and adding an extraction agent to the solution, in which the rare-earth metals are leached, to separate non-rare-earth metals from the rare-earth metals and concentrating the rare-earth metals, wherein 10 g to 20 g of the manganese nodule is mixed with one litter of the hydrochloric acid.

6. The leaching method according to claim 5, wherein the extraction agent is a di-2-ethylhexyl phosphoric acid.

* * * * *